United States Patent
Kang et al.

(10) Patent No.: US 12,220,961 B2
(45) Date of Patent: Feb. 11, 2025

(54) DRIVING ROBOT AND CONTROLLING METHOD THEREOF

(71) Applicant: SAMSUNG ELECTRONICS CO., LTD., Suwon-si (KR)

(72) Inventors: Sanghyun Kang, Suwon-si (KR); Hyunjoong Lee, Suwon-si (KR); Dongjun Choi, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 17/964,285

(22) Filed: Oct. 12, 2022

(65) Prior Publication Data

US 2023/0084455 A1 Mar. 16, 2023

Related U.S. Application Data

(63) Continuation of application No. PCT/KR2022/012730, filed on Aug. 25, 2022.

(30) Foreign Application Priority Data

Aug. 30, 2021 (KR) .......................... 10-2021-0115110
Mar. 30, 2022 (KR) .......................... 10-2022-0039820

(51) Int. Cl.
*B60G 17/0165* (2006.01)
*B60G 17/019* (2006.01)
*G05D 1/00* (2024.01)

(52) U.S. Cl.
CPC ... *B60G 17/0165* (2013.01); *B60G 17/01908* (2013.01); *G05D 1/0214* (2013.01);
(Continued)

(58) Field of Classification Search
None
See application file for complete search history.

(56) References Cited

U.S. PATENT DOCUMENTS 5,533,597 A * 7/1996 Nezu ...................... B60G 17/08
                                                                280/124.101
5,719,481 A * 2/1998 Mo .......................... F16F 9/532
                                                                318/644
(Continued)

FOREIGN PATENT DOCUMENTS

CN          206825432 U      1/2018
JP          2015-178285 A    10/2015
(Continued)

OTHER PUBLICATIONS

Communication issued on Nov. 20, 2023 by the European Patent Office in European Patent Application No. 22772402.8.
(Continued)

*Primary Examiner* — Daniel L Greene
*Assistant Examiner* — Daniel L Greene, Jr.
(74) *Attorney, Agent, or Firm* — Sughrue Mion, PLLC

(57) ABSTRACT

A driving robot includes a sensor, a loading member configured to load food, a stabilizer provided at a bottom portion of the loading member, the stabilizer including a top plate, a bottom plate, and damping plates provided between the top plate and the bottom plate, the damping plates configured to adjust damping, a driving device including a suspension and a wheel, and a processor configured to control the stabilizer and the suspension based on information of at least one of information associated with the food, information obtained from a driving map or information of surrounding situation detected by the sensor.

20 Claims, 20 Drawing Sheets

(52) U.S. Cl.
CPC ...... *B60G 2300/26* (2013.01); *B60G 2400/61* (2013.01); *B60G 2500/10* (2013.01)

(56) References Cited

U.S. PATENT DOCUMENTS

| | | | | |
|---|---|---|---|---|
| 6,015,030 | A * | 1/2000 | Grundei | F16F 9/46 |
| | | | | 267/191 |
| 6,210,097 | B1 * | 4/2001 | Kim | B25J 19/002 |
| | | | | 901/14 |
| 7,774,996 | B2 | 8/2010 | Mualla | |
| 8,307,585 | B2 | 11/2012 | Mualla | |
| 10,618,401 | B2 | 4/2020 | Lord et al. | |
| 10,974,585 | B2 | 4/2021 | Lord et al. | |
| 10,981,427 | B2 | 4/2021 | Hachisuka et al. | |
| 2004/0128921 | A1 | 7/2004 | Mualla | |
| 2010/0043317 | A1 | 2/2010 | Mualla | |
| 2010/0207343 | A1 * | 8/2010 | Sano | B60G 17/0162 |
| | | | | 280/124.106 |
| 2010/0293873 | A1 | 11/2010 | Mualla | |
| 2016/0121924 | A1 * | 5/2016 | Norstad | B60W 30/18136 |
| | | | | 701/41 |
| 2018/0043744 | A1 * | 2/2018 | Villegas Muriel | |
| | | | | B60G 21/0551 |
| 2019/0016188 | A1 | 1/2019 | Hachisuka et al. | |
| 2020/0030972 | A1 | 1/2020 | Kim | |
| 2020/0262263 | A1 * | 8/2020 | Doerksen | B60G 17/0162 |
| 2020/0290208 | A1 * | 9/2020 | Ha | G05D 1/0246 |
| 2021/0139065 | A1 * | 5/2021 | Ha | B62B 5/0026 |
| 2021/0170570 | A1 | 6/2021 | Lee et al. | |
| 2021/0174370 | A1 | 6/2021 | Yim et al. | |
| 2022/0035373 | A1 * | 2/2022 | Inamoto | G05D 1/0094 |
| 2022/0266933 | A1 | 8/2022 | Kim et al. | |
| 2022/0371591 | A1 * | 11/2022 | Craig | G01C 21/20 |
| 2022/0410649 | A1 * | 12/2022 | Koo | G05D 1/0274 |
| 2023/0311605 | A1 * | 10/2023 | Lee | B25J 19/02 |
| | | | | 280/5.514 |

FOREIGN PATENT DOCUMENTS

| | | |
|---|---|---|
| JP | 6900950 B2 | 7/2021 |
| KR | 10-2009-0019917 A | 2/2009 |
| KR | 10-2011-0059507 A | 6/2011 |
| KR | 10-1083700 B1 | 11/2011 |
| KR | 10-1188107 B1 | 10/2012 |
| KR | 10-2019-0097705 A | 8/2019 |
| KR | 10-2237533 B1 | 4/2021 |
| KR | 10-2244615 B1 | 4/2021 |
| KR | 10-2021-0072588 A | 6/2021 |
| KR | 10-2021-0080219 A | 6/2021 |
| WO | 2021/107545 A2 | 6/2021 |

OTHER PUBLICATIONS

International Search Report (PCT/ISA/210), dated Dec. 15, 2022, issued by the International Searching Authority in International Application No. PCT/KR2022/012730.

Written Opinion (PCT/ ISA/ 237), dated Dec. 15, 2022, issued by the International Searching Authority in International Application No. PCT/KR2022/012730.

* cited by examiner

DRIVING ROBOT AND CONTROLLING METHOD THEREOF

CROSS-REFERENCE TO RELATED APPLICATION(S)

This application is a continuation of International Application No. PCT/KR2022/012730 designating the United States, filed on Aug. 25, 2022, in the Korean Intellectual Property Receiving Office and claiming priority to Korean Patent Application No. 10-2021-0115110, filed Aug. 30, 2021 and Korean Patent Application No. 10-2022-0039820, filed Mar. 30, 2022, in the Korean Intellectual Property Office, the disclosures of which are incorporated by reference herein in their entireties

BACKGROUND

1. Field

The disclosure relates to a driving robot and a controlling method thereof, and more particularly, to a driving robot which stably transfers a load and a controlling method thereof.

2. Description of Related Art

Commercialization of automated technology is increasingly utilized in various fields. A customer may proceed with reservations and the like of stores or accommodation facilities through a service implemented with a trained artificial intelligence (AI) model, and may order food through a kiosk rather than through a human in even restaurants. In addition, robots cooking food which has been ordered as well as robots performing serving of food have emerged.

Robots that perform serving of food must stably deliver food to a customer. However, a floor surface of a driving path of a serving robot may not be even or there may be concavity and convexity, and the like present. Furthermore, an unexpected obstacle may appear. In this case, the serving robot may perform acceleration and deceleration due to various unstable situations, and shock according to the acceleration and deceleration may be transferred to the serving robot and the loaded food. In particular, if the food is a liquid type, the liquid type food may overflow due to the shock transferred to the serving robot.

Accordingly, the aim of the present disclosure is to provide subject-matter that improves on the prior art.

SUMMARY

Provided are a driving robot that stably transfers food to a customer and a controlling method thereof.

Additional aspects will be set forth in part in the description which follows and, in part, will be apparent from the description, or may be learned by practice of the presented embodiments.

According to an aspect of the disclosure, a driving robot may include a sensor, a loading member configured to load food, a stabilizer provided at a bottom portion of the loading member, the stabilizer including a top plate, a bottom plate, and damping plates provided between the top plate and the bottom plate, the damping plates configured to adjust damping, a driving device including a suspension and a wheel, and a processor configured to control the stabilizer and the suspension based on information of at least one of information associated with the food, information obtained from a driving map or information of surrounding situation detected by the sensor.

The suspension comprises a support member being configured to move in a horizontal direction between a second end area at which the wheel is positioned and a first end area which is in an opposite direction of an area at which the wheel is positioned. In a shock preparation driving mode, the processor may be further configured to position a support member of the suspension in a middle area between a second end area and a first end, and raise the damping by decreasing a distance between the damping plates of the stabilizer, and in a shock alleviation driving mode, the processor may be further configured to position the support member of the suspension in the second end area, and raise the damping by decreasing the distance between the damping plates of the stabilizer.

The processor may be further configured to set, based on a blind spot being detected while driving, a driving mode to the shock preparation driving mode.

The processor may be further configured to set, based on an obstacle or a shock occurring zone being detected while driving, a driving mode to the shock alleviation driving mode.

The processor may be further configured to identify a distance to an obstacle detected through the sensor, set a driving mode to the shock preparation driving mode based on identifying at least one of the obstacle being less than a pre-set distance or a time until reaching the obstacle being less than a pre-set time, and set the driving mode to the shock alleviation driving mode based on identifying at least one of the obstacle being greater than or equal to the pre-set distance or the time until reaching the obstacle being greater than or equal to the pre-set time.

The suspension may include a shock absorption member provided at a top of the first end area.

The stabilizer may include an elastic friction member provided between the damping plates.

The sensor may include a weight detection sensor provided in the loading member, the information associated with the food may include weight information of the food, and the processor may be further configured to adjust the damping by controlling a distance between the damping plates of the stabilizer based on the weight information of the food detected through the weight detection sensor.

The sensor may include an acceleration sensor provided in the loading member, the information associated with the food may include information on whether the food is a liquid type, and the processor may be further configured to identify, based on a frequency of a pre-set first range being detected through the acceleration sensor, that the food is not a liquid type, and identify, based on a frequency of a pre-set second range being detected, that the food is a liquid type.

The processor may be further configured to lock the stabilizer based on the food not being a liquid type, and unlock the stabilizer based on the food being a liquid type.

According to an aspect of the disclosure, a controlling method of a driving robot including a sensor, a loading member, a stabilizer provided at a bottom portion of the loading member, and a driving device including a suspension and a wheel, may include detecting a surrounding situation through the sensor while driving, and controlling the stabilizer and the suspension based on information of at least one of information associated with food loaded on the loading member, information obtained from a driving map or information of the detected surrounding situation.

A support member of the suspension comprises being configured to move in a horizontal direction between a second end area at which the wheel is positioned and a first end area which is in an opposite direction of an area at which the wheel is positioned. In a shock preparation driving mode, the controlling the stabilizer and the suspension may include positioning a support member of the suspension in a middle area between second end area and first end area, and raising damping by decreasing a distance between damping plates of the stabilizer, and, in a shock alleviation driving mode, the controlling the stabilizer and the suspension may include positioning the support member of the suspension in the second end area, and raising the damping by decreasing the distance between the damping plates of the stabilizer.

The controlling the stabilizer and the suspension may include setting, based on a blind spot being detected while driving, a driving mode to the shock preparation driving mode.

The controlling the stabilizer and the suspension may include setting, based on an obstacle or a shock occurring zone being detected while driving, a driving mode to the shock alleviation driving mode.

The controlling the stabilizer and the suspension may include identifying a distance with an obstacle detected through the sensor, setting a driving mode to the shock preparation driving mode based on identifying at least one of the obstacle being less than a pre-set distance or a time until reaching the obstacle being less than a pre-set time, and setting the driving mode to the shock alleviation driving mode based on identifying at least one of the obstacle being greater than or equal to the pre-set distance or the time until reaching the obstacle being greater than or equal to the pre-set time.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
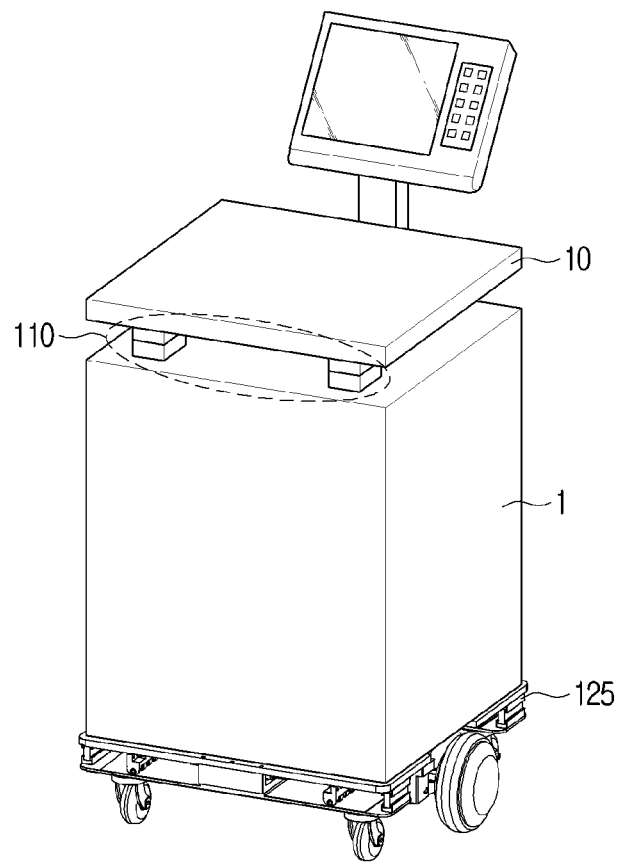
FIG. 1 is a diagram illustrating a driving robot according to an embodiment.

Various embodiments will be described in greater detail below with reference to the accompanied drawings. Embodiments described herein may be variously modified. A specific embodiment may be illustrated in the drawings and described in detail in the detailed description. However, the specific embodiment described in the accompanied drawing is only to assist in the easy comprehension of the various embodiments. Accordingly, it should be noted that embodiments of the disclosure are not limited by the specific embodiments described in the accompanied drawings, and should be interpreted to include all modifications, combinations, equivalents and/or alternatives of the embodiments included in the technical scope.

Terms including ordinal numbers such as first and second may be used in describing various elements, but the elements are not limited by the above-described terms. The above-described terms may be used only for the purpose of distinguishing one element from another element.

In the disclosure, terms such as "include" or "have" are used to designate a presence of a characteristic, number, step, operation, element, component, or a combination thereof described herein, and not to preclude a presence or a possibility of additional characteristics of one or more other characteristics or a number, a step, an operation, an element, a component or a combination thereof. When a certain element is indicated as being "coupled with/to" or "connected to" another element, it may be understood as the certain element being directly coupled with/to the another element or that other element is present therebetween. On the other hand, when a certain element is indicated as "directly coupled with/to" or "directly connected to" another element, it may be understood as the other element not being present therebetween.

The term "module" or "part" of elements used herein may perform at least one function or operation. Further, a "module" or "part" may be configured to perform a function or operation by a hardware, a software, or a combination of a hardware and a software. In addition, a plurality of "modules" or a plurality of "parts," except for a "module" or a "part" which needs to be implemented in a specific hardware or implemented in at least one processor, may be integrated to at least one module. A singular expression may include a plural expression, unless otherwise specified clearly in context.

In the disclosure, the order of each step is to be understood as non-limiting unless the order of each step needs to be performed such that a preceding step must be performed logically and temporally prior to a following step. That is, except for exceptional cases as described above, even if a process described as the following step is performed preceding a process described as the preceding step, it does not influence the nature of the disclosure and the scope of protection should also be defined regardless of the order of the step. Further, in the disclosure, expressions such as "at least one of A or B" not only refers to any one of A and B selectively, but also may be defined as including both A and B. In addition, the term "include" may have a comprehensive meaning as further including another element in addition to the elements listed as included.

In the disclosure, only the essential elements necessary in describing the disclosure have been described, and elements not related to the nature of the disclosure have been omitted.

Further, the disclosure is not to be construed in an exclusive sense including only the recited elements, but to be interpreted in a non-exclusive sense where other elements may be included.

In addition thereto, in describing the disclosure, in case it is determined that the detailed description of related known technologies or configurations may unnecessarily confuse the gist of the disclosure, the detailed description thereof will be omitted. Each embodiment may be independently implemented or operated, but each embodiment may also be implemented or operated in combination thereof.

Features described with reference to one embodiment may be combined with features from another embodiment without introducing new subject-matter.

Figure 2:
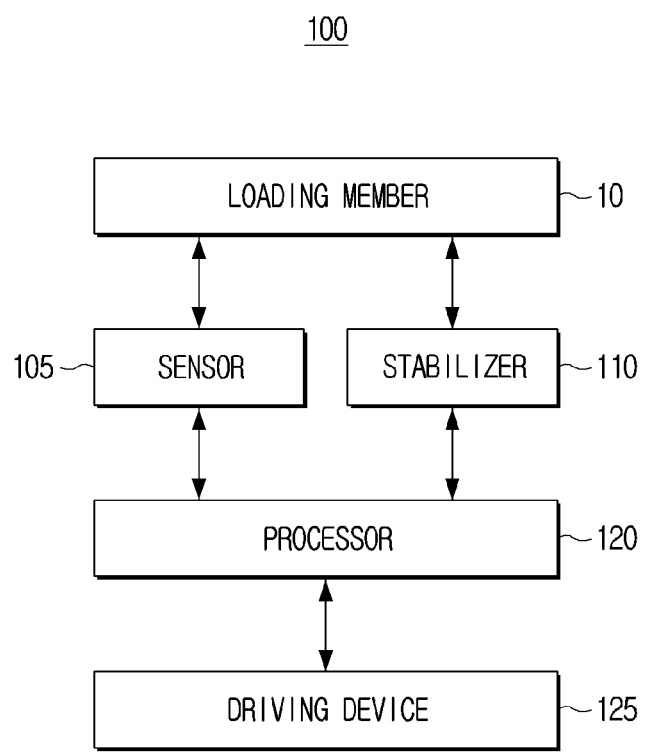
FIG. 2 is a block diagram illustrating a configuration of a driving robot according to an embodiment.
Figure 3:
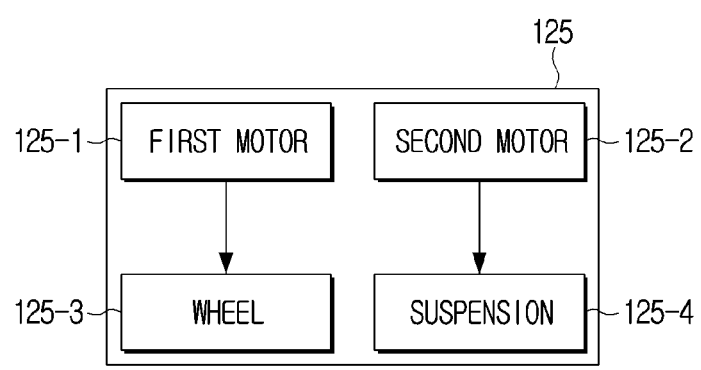
FIG. 3 is a block diagram illustrating a configuration of a driving device according to an embodiment.

FIG. 1 is a diagram illustrating a driving robot according to one or more embodiments, FIG. 2 is a block diagram illustrating a configuration of the driving robot from FIG. 1, and FIG. 3 is a block diagram illustrating a configuration of a driving device of the driving robot from FIG. 1. FIG. 1 to FIG. 3 will be referenced and described together below. The term "driving robot" may be used herein to mean a robot able to drive.

Referring to FIG. 1, the driving robot 100 may include a main body 1, a loading member 10, a stabilizer 110, and a driving device 125. In addition, referring to FIG. 2, the driving robot may include a sensor 105 and a processor 120 in addition to the above-described configurations.

The main body 1 may include a processor which controls each configuration of the driving robot 100. The loading member 10 may load or receive a load. For example, a load may include various products, food, and the like, and food may include a liquid type having fluidity, a non-liquid type having nearly no fluidity, or the like. The loading member 10 may be implemented in a structure suitable for serving food, but is not limited to the structure for serving food, and may be implemented in a structure that provides a service for cleaning, guiding, patrolling, emergency situation responses, or the like.

The stabilizer 110 may be disposed at a bottom portion of the loading member 10. The stabilizer 110 may minimize a movement of the loading member 10 even if shock is transferred to the main body 1 due to shock according to an acceleration and deceleration of the driving robot 100, and a floor state.

Referring to FIG. 3, the detailed configuration of the driving device 125 from the driving robot 100 (FIG. 1) is shown. The driving device 125 is disposed at a bottom portion of the main body 1 and may be configured to move or drive the driving robot 100. The driving device 125 may include a first motor 125-1, a second motor 125-2, a wheel 125-3, and a suspension 125-4. The first motor 125-1 may drive the wheel 125-3. The second motor 125-2 may control the suspension 125-4. If a speed or direction is changed while the driving robot 100 is in movement, the suspension 125-4 may absorb the shock caused by inertia. The detailed description on the suspension 125-4 is provided below.

The sensor 105 may detect information (e.g., signal, data, etc.) associated with a load of the driving robot 100, and transfer the detected information to the processor 120. The processor 120 may determine whether the load is a liquid type based on the information transferred from the sensor 105. For example, the sensor 105 may include a red, green, blue (RGB) sensor, and capture the load using the RGB sensor. Then, the sensor 105 may transfer a captured image to the processor 120. The image may include a still image or a moving image. The processor 120 may determine whether the load is a liquid type based on the captured image. For example, the processor 120 may identify a change in the load (e.g., a jerking of a load) in a continuing still image or a moving image. The processor 120 may determine whether the load is a liquid type based on the identified change in the load. Alternatively, the sensor 105 may include an acceleration sensor (e.g. an accelerometer), and detect a frequency of an object loaded on the loading member 10 using the acceleration sensor. The processor 120 may determine whether the load is a liquid type based on the detected frequency and a range of a pre-set frequency. For example, the processor 120 may determine that the load is not a liquid type based on the detected frequency being near about 1 Hz, and determine that the load is a liquid type based on the detected frequency being about 2-4 Hz. Alternatively, the sensor 105 may detect surrounding environment information, and the processor 120 may identify a state of a floor, whether there are obstacles, whether it is a destination, and the like based on the detected information. For example, based on the sensor 105 including the RGB sensor, the RGB sensor may capture a surrounding environment which includes a floor surface of the driving robot 100. The processor 120 may image process the captured image, and identify a state of a road surface, whether there is concavity and convexity on a floor, whether there is an obstacle, and the like based on the image processed data. Then, the processor 120 may identify whether it is the destination based on information on a pre-stored destination (e.g., an image associated with a destination, table identification number, etc.) and the image processed data. Alternatively, based on the sensor 105 including an infrared sensor, an ultrasonic sensor, a Time-of-Flight (ToF) sensor, a light detection and ranging (LiDAR) sensor, a laser sensor, and the like, the sensor 105 may transfer data associated with a transmission signal and a reception signal to the processor 120, and the processor may identify the state of the road surface, whether there is concavity and convexity on the floor, whether there is an obstacle, and the like based on the received transmission data and reception data. Alternatively, based on the sensor 105 including a motion recognition sensor, a thermal detection sensor, and the like, the sensor 105 may transfer the detected information to the processor 120, and the processor 120 may identify whether there is an obstacle, and the like based on the received information. Alternatively, based on the sensor 105 including a weight detection sensor (e.g. scales), the weight detection sensor may detect a weight of the loaded food.

The processor 120 may perform a corresponding control operation based on the detected surrounding environment information. The processor 120 may accelerate or decelerate a speed of the driving robot 100 based on the information detected from the sensor 105, or set the stabilizer 110 and the suspension 125-4 to a shock preparation mode or a shock alleviation mode. Alternatively, the sensor 105 may detect a signal corresponding to a weight of a load on the loading member 10. For example, the sensor 105 may include a gravity sensor (e.g. an accelerometer) and the like and detect a signal corresponding to the weight of the load. The processor 120 may identify the weight of the load based on the signal corresponding to the detected weight of the load from the sensor 105. Then, the processor 120 may adjust a damping of the stabilizer 110 based on the identified weight. For example, the driving robot 100 may store damping ratio data of the stabilizer 110 corresponding to the weight of the load in a memory as a lookup table. The processor 120 may adjust the damping of the stabilizer 110 based on the stored lookup table. For example, the sensor 105 may include the acceleration sensor, the gravity sensor, a gyro sensor, a geomagnetic sensor, an orientation sensor, an image sensor, the infrared sensor, the ultrasonic sensor, the ToF sensor, the LiDAR sensor, the laser sensor, the motion recognition sensor, a proximity sensor, a voltmeter, an ammeter, a barometer, an hygrometer, a thermometer, an illuminance sensor, a heat detection sensor, a touch sensor, and the like.

The processor 120 may control each configuration of the driving robot 100. For example, the processor 120 may control the sensor 105 to detect a load, a surrounding environment, a weight of a load, a frequency, and the like. Then, the processor 120 may control the driving device 125 for the driving robot 100 to move. The processor 120 may control the stabilizer 110 and the suspension 125-4 to be set to the shock preparation mode or the shock alleviation mode based on the detected driving environment, and the like.

For example, the stabilizer 110 may be locked if the processor 120 determines the load as not a liquid type, and the stabilizer 110 may be unlocked if the load is determined as a liquid type. Based on the stabilizer 110 being locked, the stabilizer 110 may be in a fixed state or a state similar with the fixed state as yawing is reduced, and the driving robot 100 may move in a stable state at even a high speed. Based on the stabilizer 110 being unlocked, the processor 120 may adjust the damping ratio of the stabilizer 110 according to the weight of the load, the speed of the driving robot 100, a state of the load, and the like. The damping ratio may refer to a movement degree of a ball included in the stabilizer 110. Based on the driving robot 100 accelerating and decelerating or rotating, the ball of the stabilizer 110 may move within a ball housing. When the damping ratio is raised, the movement of the ball may be slowed because a frictional force between the ball and the ball housing is increased, and when the damping ratio is lowered, the movement of the ball may increase because the frictional force between the ball and the ball housing is decreased. A structure and operation of the stabilizer 110 will be described in detail in FIG. 6.

The processor may set the driving robot 100 to the shock preparation mode when a blind spot is detected. The processor may set the driving robot 100 to the shock alleviation mode when an obstacle or a shock occurring zone (e.g., an uneven road surface, concavity and convexity, etc.) is detected. Alternatively, the processor 120 may set the driving robot 100 to the shock preparation mode or the shock alleviation mode according to a distance between the driving robot 100 and the obstacle. Specific examples of the shock preparation mode and the shock alleviation mode will be described below. Although one processor 120 is shown in FIG. 2, the driving robot 100 may include a plurality of processors 120. For example, if the driving robot 100 includes the plurality of processors 120, a main processor controlling a main function of the driving robot 100, a sub processor supporting the main processor, and the like may be included. Alternatively, the driving robot 100 may include a plurality of processors which control operations associated with different functions such as a first processor controlling a driving function and a second processor processing a sensing signal. Alternatively, the driving robot 100 may include a plurality of processors controlling different elements of the driving robot 100 such as a first processor controlling the stabilizer and the suspension and a second processor controlling the sensor.

The driving robot 100 may include various configurations in addition to the above-described configurations to alleviate shock which may occur during driving. For example, the driving robot 100 may further include an input part which inputs serving information including food order, destination, and the like, an output part which outputs various information, a memory which stores an algorithm associated with the driving or operation of the driving robot 100, data, and the like. The various configurations which may be included in the driving robot 100 will be described below.

Figure 4:
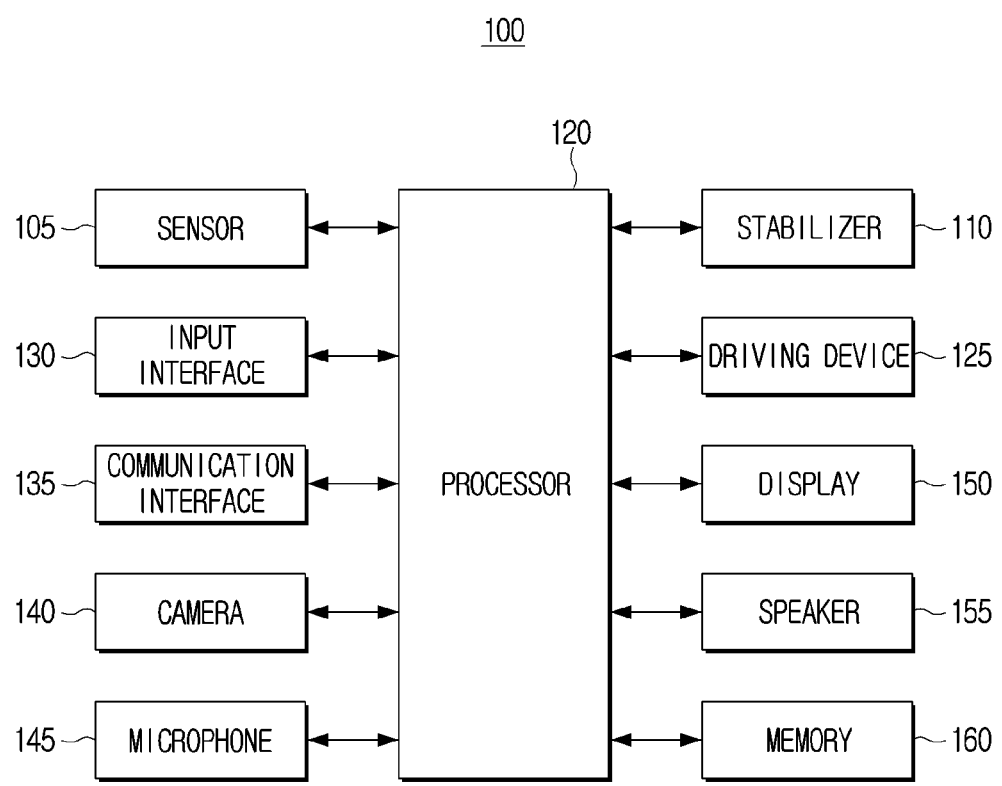
FIG. 4 is a block diagram illustrating a configuration of a driving robot according to an embodiment.

FIG. 4 is a block diagram illustrating a configuration of the driving robot according to one or more embodiments.

Referring to FIG. 4, the driving robot 100 may include the sensor 105, the stabilizer 110, the processor 120, the driving device 125, an input interface 130, a communication interface 135, a camera 140, a microphone 145, a display 150, a speaker 155, a memory 160, and the like. Because the sensor 105 and the driving device 125 are the same as that described in FIG. 1 to FIG. 3, the detailed description will be omitted. Further, the function of the stabilizer 110 is the same as that described in FIG. 1 to FIG. 3, and the structure and operation will be additionally described in FIG. 6.

The input interface 130 may receive input of a control command from a user. For example, the input interface 130 may include a keypad, a touch pad, a touch screen, and the like. The input interface 130 may be referred to an input device, an input part, an input module, and the like.

The communication interface 135 may perform communication with an external device. For example, the communication interface 135 may perform communication with the external device through at least one communication method from among communication methods of Wi-Fi, Wi-Fi direct, Bluetooth, ZigBee, 3rd Generation (3G), 3rd Generation Partnership Project (3GPP), and Long Term Evolution (LTE). The communication interface 135 may receive information such as a driving map and serving information, and the like from the external device. The communication interface 135 may be designated as a communication device, a communication part, a communication module, a transmitting and receiving part, and the like.

The camera 140 may capture a surrounding environment of the driving robot 100. Alternatively, the camera 140 may capture an expression, a motion, and the like of the user. The processor 120 may obtain information on the surrounding environment or perform an operation corresponding to the expression, the motion, and the like of the user based on the image captured from the camera 140. Cameras of various types performing different functions may be disposed in the driving robot 100. Alternatively, at least one the camera 140 of the same type may be disposed in the driving robot 100. For example, the camera 140 may include a charge-coupled device (CCD) sensor and a complimentary metal-oxide semiconductor (CMOS) sensor. In addition, the camera 140 may include an RGB camera, a depth camera, a wide angle camera, a telephoto camera, and the like The microphone 145 may receive input of a voice of the user. The driving robot 100 may include one microphone 145, or include a plurality of microphones 145. For example, the microphone 145 may include a general microphone, a surround microphone, a directional microphone, and the like.

The display 150 may output data processed from the processor 120 as an image. The display 150 may display information, and output a screen corresponding to a recognized user command. For example, the display 150 may be implemented as a liquid crystal display (LCD), an organic light emitting diode (OLED), a flexible display, a touch screen, and the like. When the display 150 is implemented as a touch screen, the driving robot 100 may receive input of the control command through the touch screen.

The speaker 155 may output a sound signal. For example, the speaker 155 may output information on an input command of the user, warning related information, state related information of the driving robot 100, operation related information, or the like in a voice or a notification sound.

The memory 160 may store data, algorithm, and the like which perform a function of the driving robot 100, and store programs, commands, and the like which are operated in the driving robot 100. Alternatively, the memory 160 may store a driving map, data associated with serving or driving, and the like. The algorithm or data stored in the memory 160 may be loaded to the processor 120 by the control of the processor 120 and perform a driving related function. For example, the memory 160 may be implemented to types such as, for example, and without limitation, a read only memory (ROM), a random access memory (RAM), a hard disk drive (HDD), a solid disk drive (SDD), a memory card, and the like.

The driving robot 100 may include all the above-described configurations, or include some configurations. In the above, configurations of the driving robot 100 have been described. The suspension 125-4 and the stabilizer 110 will be described below.

Figure 5:
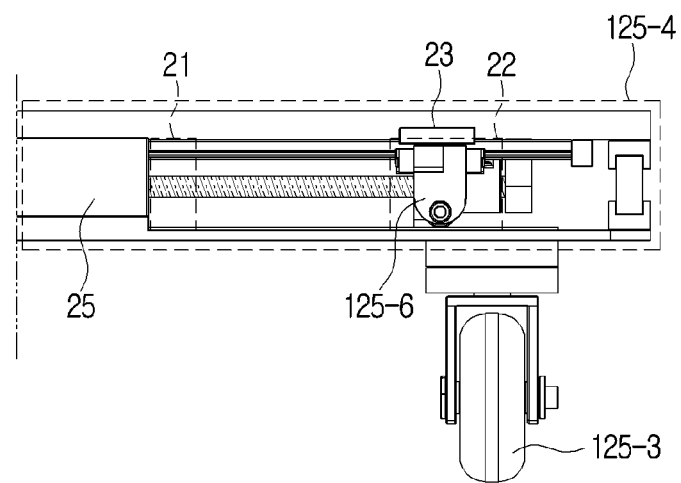
FIG. 5 is a diagram illustrating a structure of a driving device according to an embodiment.

FIG. 5 is a diagram illustrating a structure of the driving device according to one or more embodiments.

Referring to FIG. 5, the driving device 125 may include the suspension 125-4 and the wheel 125-3. Further, the suspension 125-4 may include a support member 125-6 and a shock absorption member 23. The support member 125-6 may move between a first end area 21 and a second end area 22 in a horizontal direction based on a length direction of the suspension 125-4 by a control of a motor. In other words, the support member 125-6 may move between the second end area 22 and the first end area 21 along a longitudinal direction of the suspension 125-4. The first end area 21 may refer an area at which a fixing block 25 is positioned in an area in an opposite direction of an area at which the wheel 125-3 is positioned. The second end area 22 may be the area at which the wheel 125-3 is positioned. The second end area 22 may refer to an area in which the support member 125-6 maximally moves based on the fixing block 25.

Based on the support member 125-6 moving toward the first end area 21, a rigidity of the suspension 125-4 may be lowered because a gap between the wheel 125-3 and the support member 125-6 is increased. If the rigidity of the suspension 125-4 is lowered, the suspension 125-4 may alleviate vibrations caused from the road surface when the driving robot 100 is driving on the uneven road surface at a certain speed. In addition, based on the load being a liquid type, the driving robot 100 may alleviate the jerking of the liquid type load by reducing the jerking by lowering the rigidity of the suspension 125-4.

Based on the member 125-6 moving toward the second end area 22, the rigidity of the suspension 125-4 may be raised because the gap between the wheel 125-3 and the support member 125-6 is decreased. If the rigidity of the suspension 125-4 is raised, the jerking may be prevented or reduced when the driving robot 100 is accelerated or decelerated. Alternatively, when there is no load or the load is not a liquid type, the driving robot 100 may drive at a high speed by raising the rigidity of the suspension 125-4.

In addition, the shock absorption member 23 may be disposed at a top end part of the second end area 22 of the suspension 125-4 and perform a role of a damper. That is, if the suspension 125-4 is in a state of high rigidity because the support member 125-6 is positioned at the second end area 22 of the suspension 125-4, the shock absorption member 23 may absorb the shock received by the suspension 125-4 at a sudden stopping of the driving robot 100. For example, the shock absorption member 23 may be implemented with materials having elasticity such as, for example, and without limitation, urethane, rubber, sponge, and the like.

Figure 6:
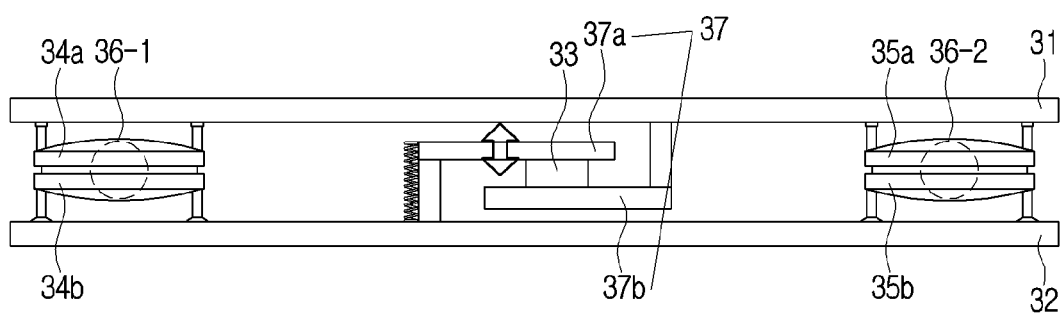
FIG. 6 is a diagram illustrating a structure of a stabilizer according to an embodiment.

FIG. 6 is a diagram illustrating a structure of the stabilizer according to one or more embodiments.

Referring to FIG. 6, the stabilizer 110 may include a top plate 31, a bottom plate 32, top side ball housings 34a and 35a, bottom side ball housings 34b and 35b, balls (or, rollers) 36-1 and 36-2, an elastic friction member 33, a damping plate 37 comprising a top side damping plate 37a and a bottom side damping plate 37b, and the like. The top side ball housings 34a and 35a and the bottom side damping plate 37b may be coupled with the top plate, and the bottom side ball housings 34b and 35b and the top side damping plate 37a may be coupled with the bottom plate 32. A first top side ball housing 34a and a first bottom side ball housing 34b may be implemented as one set, and a first ball 36-1 may be positioned between the first top side ball housing 34a and the first bottom side ball housing 34b. Similarly, a second top side ball housing 35a and a second bottom side ball housing 35b may be implemented as one set, and a second ball 36-2 may be positioned between the second top side ball housing 35a and the second bottom side ball housing 35b. The top plate 31 which is coupled with the top side ball housings 34a and 35a and the bottom plate 32 which is coupled with the bottom side ball housings 34b and 35b may move separately due to the balls 36-1 and 36-2. In addition, the stabilizer 110 may include the elastic friction member 33 between the top side damping plate 37a and the bottom side damping plate 37b. For example, the stabilizer 110 may include a motor for controlling the damping which adjusts a gap between the top side damping plate 37a and the bottom side damping plate 37b. The motor for controlling the damping may control the damping ratio of the stabilizer 110 by adjusting the gap between the top side damping plate 37a and the bottom side damping plate 37b according to the control of the processor 120. As described above, the damping ratio may refer to a degree of movement of the balls 36-1 and 36-2 included in the stabilizer 110. When the driving robot 100 is accelerated and decelerated or rotated, the ball of the stabilizer 110 may move within the ball housings 34a, 34b, 35a, and 35b. Then, the top plate 31 which is capable of moving separately from the bottom plate 32 may be subject to friction with the balls 36-1 and 36-2 and move according to the movement of the balls 36-1 and 36-2. Because the movement of the balls 36-1 and 36-2 is slowed due to the frictional force between the balls 36-1 and 36-2 and the ball housings 34a, 34b, 35a, and 35b increasing when the damping ratio is raised, and the frictional force between the balls 36-1 and 36-2 and the ball housings 34a, 34b, 35a, and 35b decreasing when the damping ratio is lowered, the movement of the balls may grow or increase. If the movement of the balls 36-1 and 36-2 is slowed, the movement of the top plate 31 may also be slowed based on the bottom plate 32, and if the movement of the balls 36-1 and 36-2 becomes greater or is increased, the movement of the top plate 31 may also become greater or increase based on the bottom plate 32. For example, the elastic friction member 33 may be implemented with materials having elasticity such as, for example, and without limitation, urethane, rubber, sponge, and the like.

Based on there being no load or the load not being a liquid type, the driving robot 100 may drive at a high-speed locking the stabilizer 110. Based on the load being a liquid type, the driving robot 100 may unlock the stabilizer 110 and adjust the damping of the stabilizer 110 according to the situation. For example, the stabilizer 110 may include a link structure which may perform holding of the ball housings 34a, 34b, 35a, and 35b. If the link structure is spaced apart from the ball housings 34a, 34b, 35a, and 35b, the stabilizer 110 may be in an unlocked state. If the link structure performs holding of the ball housings 34a, 34b, 35a, and 35b by being closely contacted with the ball housings 34a, 34b, 35a, and 35b, the stabilizer 110 may be in a locked state. Based on the stabilizer 110 being locked, the stabilizer 110 may be in the fixed state or a state similar with the fixed state as yawing is reduced, and the driving robot 100 may move in the stable state at even a high speed. The yawing may refer to movements in forward, backward, left, and right directions on a plane. That is, if the stabilizer 110 is locked, the yawing may be reduced because the ball housing is on holding, and if the stabilizer 110 is unlocked, the processor 120 may adjust the damping ratio of the stabilizer according to the weight of the load, the speed of the driving robot, the state of the load, and the like.

For example, if the load is a liquid type and the weight of the load is heavy, the driving robot 100 may raise the damping of the stabilizer 110, and if the weight of the load is light, the driving robot 100 may lower the damping of the stabilizer 110. In addition, if the driving robot 100 is rotated in situ or rotated around a corner, the yawing may be reduced by raising the damping of the stabilizer 110. As described above, if the damping of the stabilizer 110 is raised, the movement of the top plate 31 may also be slowed. Because the movement of the top plate 31 being slowed means the movement of the top plate 31 being slowed in the forward, backward, left and right directions on the plane, the yawing may be reduced.

The driving robot 100 may raise the damping of the stabilizer by decreasing the distance of the damping plates disposed between the top plate 31 and the bottom plate 32 of the stabilizer. Alternatively, the driving robot 100 may decrease the damping of the stabilizer by increasing the distance between the damping plates disposed between the top plate 31 and the bottom plate 32 of the stabilizer.

In the above, the structures of the driving device and the stabilizer of the driving robot 100 have been described. A controlling process of the driving robot 100 according to a driving environment will be described below.

Figure 7A:
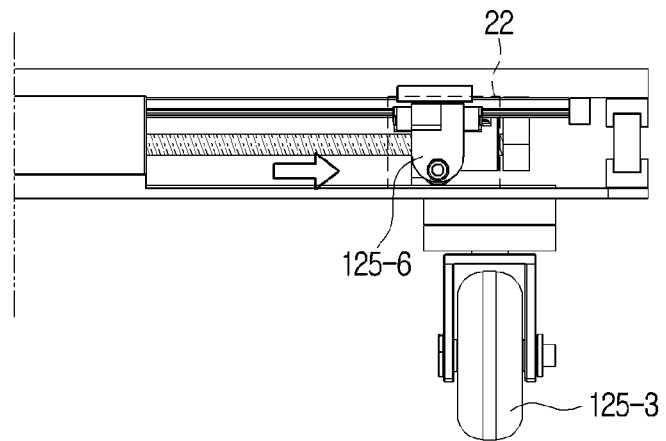
FIG. 7A and FIG. 7B are diagrams illustrating a shock alleviation mode according to an embodiment.
Figure 7B:
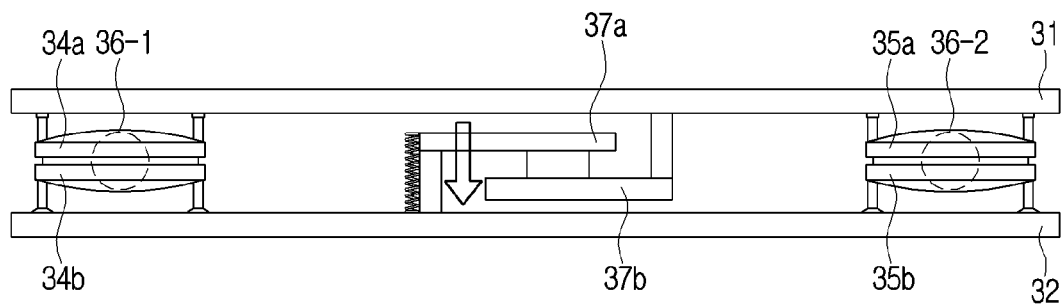

FIG. 7A and FIG. 7B are diagrams illustrating the shock alleviation mode according to one or more embodiments. FIG. 7A and FIG. 7B will be referenced and described together.

For example, the shock alleviation mode may refer to a mode of setting a state of the stabilizer and the suspension to a first state for the driving robot 100 to detect in advance an obstacle or a shock occurring zone (e.g., an uneven road surface, concavity and convexity, etc.), and alleviate shock applied by an external environment.

For example, as shown in FIG. 7A, the driving robot 100 may move the support member 125-6 of the suspension to the second end area 22 at which the wheel 125-3 is positioned. For example, the processor 120 may transmit a control signal moving the support member 125-6 to the second motor 125-2, and the second motor 125-2 may move the support member 125-6 to the second end area 22 according to the received control signal. As described above, based on the support member 125-6 of the suspension moving to the second end area 22, the rigidity of the suspension may be raised because the gap between the support member 125-6 and the wheel 125-3 is shortened. Based on the rigidity of the suspension being raised, a phenomenon of the main body of the robot falling forward may be prevented because high rigidity is maintained by the suspension even if a normal force by a surface falls toward the front surface according to decelerating and stopping of the driving robot 100.

In addition, as shown in FIG. 7B, the driving robot 100 may adjust the gap (e.g. decrease the gap) between the top side damping plate 37a and the bottom side damping plate 37b positioned between the top plate 31 and the bottom plate 32 of the stabilizer. For example, the processor 120 may transmit a control signal adjusting the gap (e.g. decrease the gap) of the damping plates 37a and 37b to the motor for controlling the damping included in the stabilizer, and the motor for controlling the damping may adjust the gap between the damping plates 37a and 37b according to the received control signal. As the gap between the damping plates 37a and 37b of the stabilizer is decreased, the gaps of the top side ball housings 34a and 35a and the bottom side ball housings 34b and 35b may also decrease. As the damping of the stabilizer is increased due to the frictional force of the housings 34a, 34b, 35a, and 35b and the balls 36-1 and 36-2 increasing according to the gaps of the top and bottom side ball housings 34a, 34b, 35a, and 35b being decreased, the stabilizer may be prevented from being jerked significantly by inertia.

That is, the driving robot 100 may set the shock alleviation mode by positioning the support member of the suspension to the second end area 22 at which the wheel is positioned, and decreasing the gap between the damping plates 37a and 37b of the stabilizer to raise the damping. For example, the driving robot 100 may store data of the damping ratio of the stabilizer corresponding to acceleration or gap data of the damping plate in the memory 160 as a lookup table. The processor 120 may adjust the damping by controlling the gap between the damping plates 37a and 37b of the stabilizer 110 based on the stored lookup table. The lookup table may be generated in advance when manufacturing the driving robot 100.

Figure 8A:
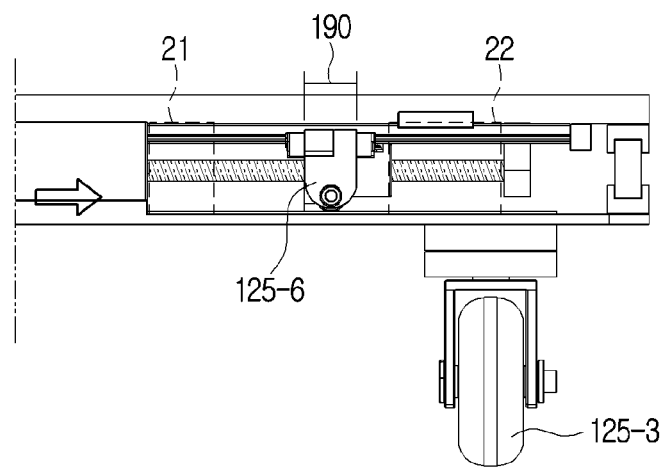
FIG. 8A and FIG. 8B are diagrams illustrating a shock preparation mode according to an embodiment.
Figure 8B:
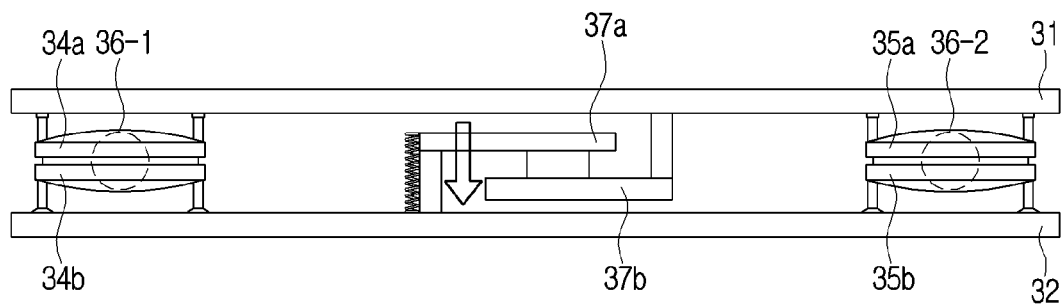

FIG. 8A and FIG. 8B are diagrams illustrating the shock preparation mode according to one or more embodiment.

For example, the shock preparation mode may be a mode for the driving robot 100 to prepare for a sudden obstacle or collision occurring situation and may refer to a mode for setting the state of the stabilizer and the suspension in a second state.

For example, as shown in FIG. 8A, the driving robot 100 may position the support member 125-6 of the suspension in a middle area 190 between the first end area 21, which is opposite of the area at which the wheel 125-3 is positioned, and the second end area 22 at which the wheel 125-3 is positioned. For example, the processor 120 may transmit a control signal moving the support member 125-6 to the second motor 125-2, and the second motor 125-2 may move the support member 125-6 to the middle area 190 according to the received control signal. The reason for positioning the support member 125-6 in the middle area 190 between the first end area 21 and the second end area 22 is to prepare for the raising of rigidity of the suspension by moving the support member 125-6 to the second end area 22 at any time and quickly in preparation of a suddenly occurring situation.

In addition, as shown in FIG. 8B, the driving robot 100 may decrease the gap between the top side damping plate 37a and the bottom side damping plate 37b positioned between the top plate 31 and the bottom plate 32 of the stabilizer. For example, the processor 120 may transmit a control signal decreasing the gap of the damping plates 37a and 37b to the motor for controlling the damping included in the stabilizer, and the motor for controlling the damping may decrease the gap between the damping plates 37a and 37b according to the received control signal. For example, the driving robot 100 may store damping ratio data corresponding to acceleration or gap data of the damping plates 37a and 37b in the memory 160 as a lookup table. The processor 120 may adjust the damping of the stabilizer 110 based on the stored lookup table. As the gap between the damping plates 37a and 37b of the stabilizer is decreased, the gaps of the top side ball housings 34a and 35a and the bottom side ball housings 34b and 35b may also be decreased. The damping of the stabilizer may be raised due to the frictional force of the housings 34a, 34b, 35a, and 35b and the balls 36-1 and 36-2 increasing according to the gaps of the top and bottom side ball housings 34a, 34b, 35a, and 35b being decreased. If the damping of the stabilizer is raised, the stabilizer may prevent significant jerking due to inertia when the driving robot is stopped. For example, if the damping of the stabilizer is raised, it is to prevent a situation in which the balls (or rollers) 36-1 and 36-2 may be prevented from falling toward one side and colliding at a distal end due to the yawing (e.g., falling phenomenon in left and right directions) when the driving robot 100 is rotated.

That is, the driving robot 100 may set the shock preparation mode by positioning the support member of the suspension in the area between the first end area 21 which is the opposite direction of the area at which the wheel is positioned and the second end area 22 at which the wheel is positioned, and moving the damping plate of the stabilizer downward to raise the damping.

As described above, the shock alleviation mode may be a mode which is set when an occurrence of shock is predicted according to a detection of a surrounding situation or when there is sufficient time until the occurrence of shock (or, when an estimated time until the occurrence of shock is greater than or equal to a pre-set time), and the shock preparation mode may be a mode which is set when preparing for a sudden shock that may occur in an undetected area or when there is insufficient time until the occurrence of shock (or, when the estimated time until the occurrence of shock is less than the pre-set time). For example, the driving robot 100 may set the shock alleviation mode when an obstacle, an uneven road surface state, or the like is detected in advance through the sensor. Alternatively, the driving robot may set the shock alleviation mode for deceleration based on the detected obstacle being within a pre-set distance with the driving robot 100. Alternatively, the driving robot may set the shock alleviation mode based on being positioned within a pre-set distance with the detected obstacle. Based on the driving robot 100 passing a blind spot, an obstacle may suddenly appear in the blind spot. Accordingly, the driving robot 100 may set the shock preparation mode for a sudden stopping or the like when passing the blind spot. For example, the blind spot may include an area in which a path is present at a side surface, a corner area, and the like based on the path the driving robot 100 is driving.

FIG. 9A, 9B, 9C, 9D, 9E and FIG. 9F are diagrams illustrating an acceleration and deceleration process of the driving robot according to one or more embodiments. FIG. 9A to FIG. 9F will be referenced and described together.

Figure 9A:
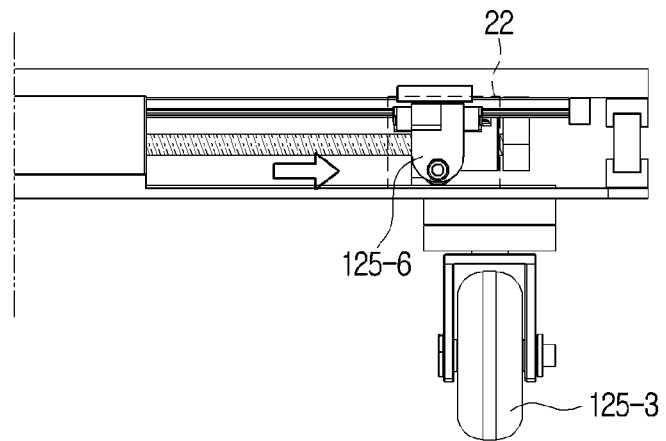
FIG. 9A, 9B, 9C, 9D, 9E and FIG. 9F are diagrams illustrating an acceleration and deceleration process of a driving robot according to an embodiment.
Figure 9B:
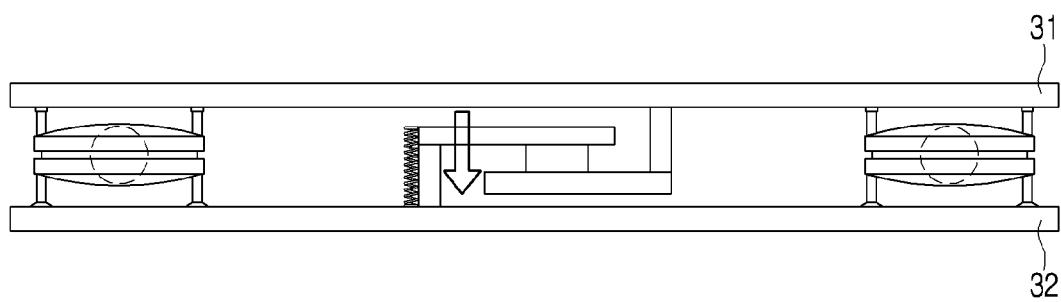

The driving robot 100 may decelerate its speed according to situations such as discovering an obstacle while driving or changing of a direction. The driving robot 100 may accelerate its speed when the situation is ended. The driving robot 100 may drive based on the driving map, and the driving map may be included with information on fixed or pre-known obstacles or various situations. Because the determining of a situation for acceleration and deceleration by the driving robot 100 driving based on the driving map means a situation in which an obstacle is recognized or a possibility of shock occurring is recognized, the driving robot 100 may set the suspension and the stabilizer to the above-described shock alleviation mode. In FIG. 9A and FIG. 9B, the suspension and the stabilizer which are respectively set to the shock alleviation mode is shown.

Figure 9C:
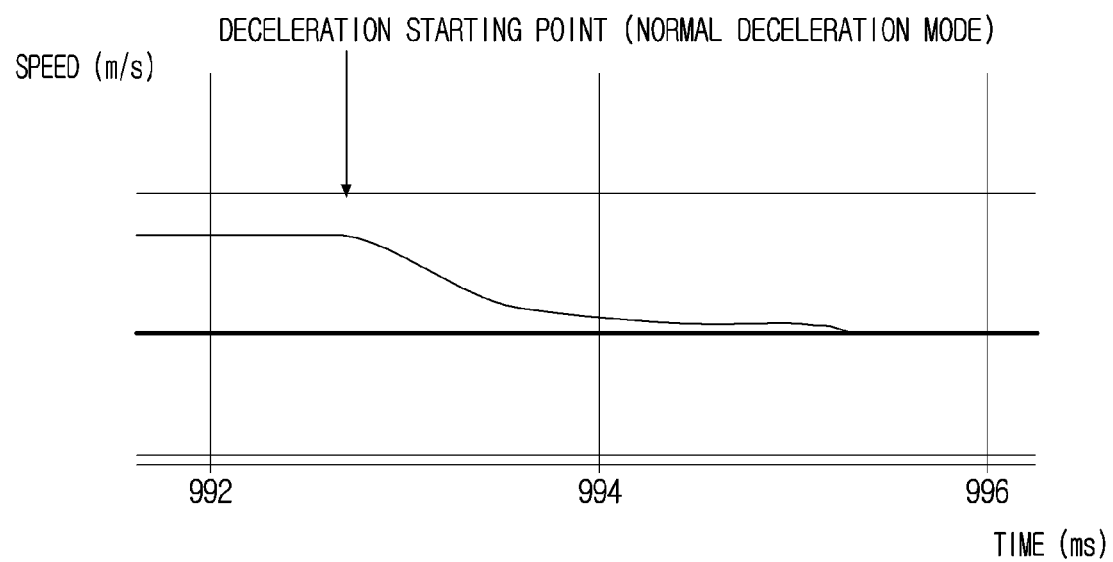

The driving robot 100 may set the suspension and the stabilizer to the shock alleviation mode and decelerate. As shown in FIG. 9C, the driving robot 100 driving at a certain speed may first set the suspension and the stabilizer to the shock alleviation mode and perform the deceleration process. The driving robot 100 may set the suspension to a state of high rigidity, and prevent the phenomenon of the main body falling forward or the stabilizer being jerked significantly by inertia even if shock is transferred by decelerating due to the damping of the stabilizer being raised.

Figure 9D:
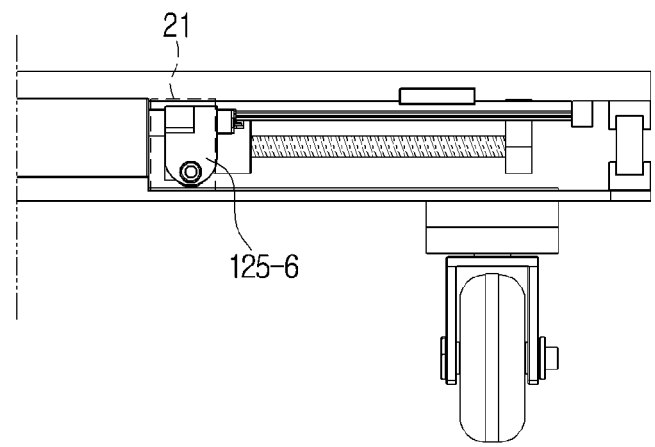
Figure 9E:
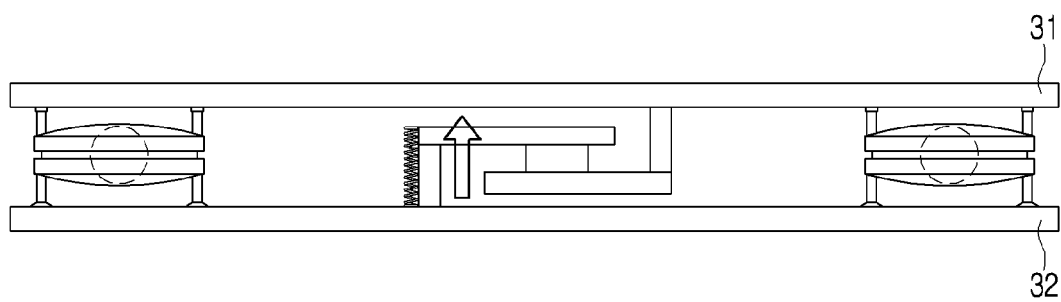

If the driving robot 100 passes an uneven road surface such as concavity and convexity, the driving robot 100 may decelerate as in the above-described process. If decelerated to a target speed, the driving robot 100 may pass the uneven road surface at the decelerated speed. At this time, the driving robot 100 may lower the rigidity of the suspension and pass the uneven road surface at a low speed. That is, as shown in FIG. 9D, the driving robot 100 may move the support member 125-6 of the suspension to the first end area 21 which is the opposite direction of the area at which the wheel is positioned. As described above, based on the support member 125-6 of the suspension moving to the first end area 21, the rigidity of the suspension may be lowered because the gap between the support member 125-6 and the wheel 125-3 is increased. Based on the rigidity of the suspension being lowered, the suspension may absorb the shock generated from the uneven road surface. Based on passing the uneven road surface, the driving robot 100 may raise the rigidity of the suspension again for acceleration. The driving robot 100 may move at a constant speed if accelerated until the target speed. If the speed of the driving robot 100 reaches a constant speed, the driving robot 100 may lower the rigidity of the suspension and the damping of the stabilizer again. That is, as shown in FIG. 9D, the driving robot 100 may lower the rigidity of the suspension by moving the support member 125-6 of the suspension to the first end area 21 which is the opposite direction of the area at which the wheel is positioned. In addition, as shown in FIG. 9E, the driving robot 100 may lower the damping of the stabilizer by increasing the gap between the damping plates 37a and 37b. Based on the damping of the stabilizer being lowered, the jerking of the main body of the driving robot 100 may not be transferred to the load positioned over the loading member.

Figure 9F:
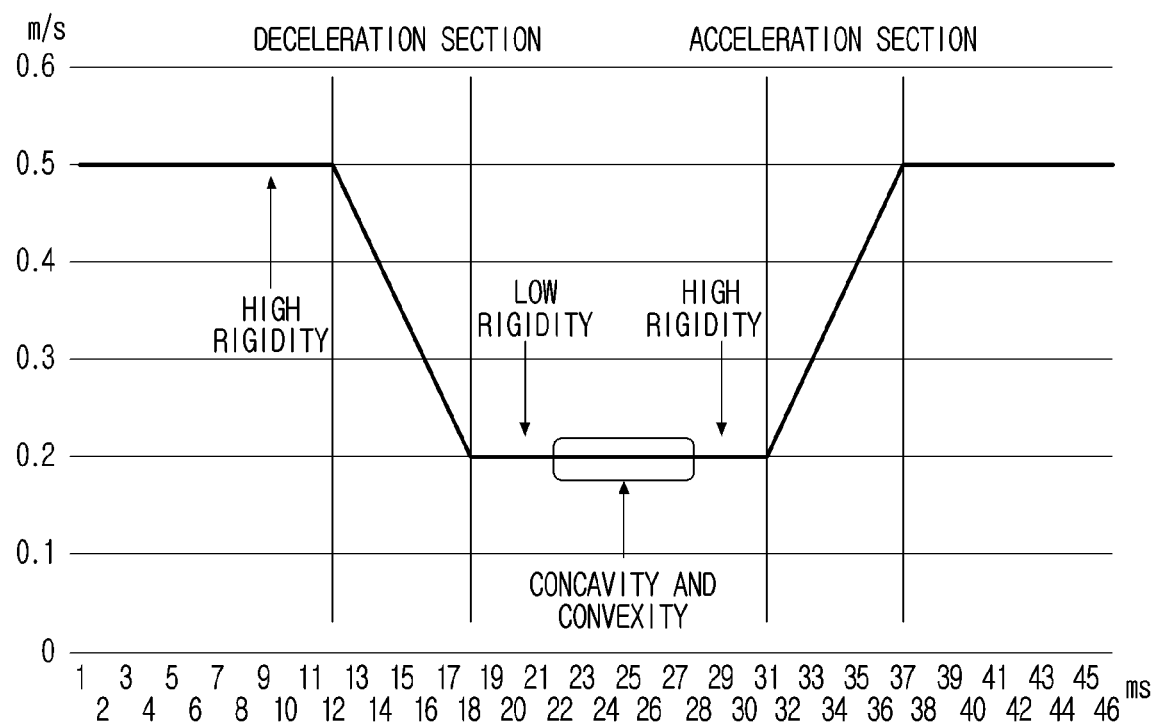

Referring to FIG. 9F, a graph representing the above-described process is shown. The driving robot 100 may drive at a certain speed. For example, when an uneven road surface (or, obstacle) such as the concavity and convexity is detected, the driving robot 100 may set the suspension to a state of high rigidity and raise the damping of the stabilizer. Then, the driving robot 100 may decelerate. For example, as shown in FIG. 2 and FIG. 3, the processor 120 may transmit a deceleration control signal to the first motor 125-1 of the driving device 125. The first motor 125-1 may slow a driving speed of the wheel 125-3 based on the received deceleration control signal. An acceleration process of the driving robot 100 may also be performed similarly with the above-described process. When deceleration is complete, the driving robot 100 may lower the rigidity of the suspension and the damping of the stabilizer and pass the uneven road surface at a low speed. When the driving robot 100 passes the uneven road surface, an intensity of the suspension may be raised. Then, the driving robot 100 may accelerate. When the driving robot 100 is accelerated to the target speed, the intensity or rigidity of the suspension may be lowered, and the damping of the stabilizer may be lowered.

Figure 10:
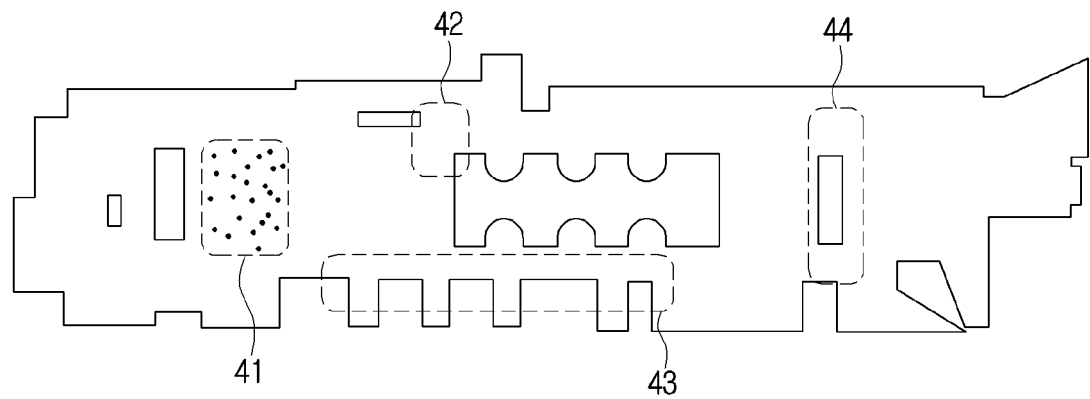
FIG. 10 is a diagram illustrating various situations based on a driving map according to an embodiment.

FIG. 10 is a diagram illustrating various situations based on the driving map according to one or more embodiments.

Referring to FIG. 10, a driving map including various environments is shown. The driving map may be stored in the memory of the driving robot 100. The driving map may include an uneven road surface area 41, a narrow path 42, a general path 43, and a curve section 44. Alternatively, if a fixed obstacle is present, the driving map may include information on the fixed obstacle.

When the driving robot 100 is driving based on the driving map, the uneven road surface area 41 may be detected by the driving map or a detection of the sensor. Based on the driving robot 100 passing an area in which the occurrence of shock is predictable such as the uneven road surface area 41 and the curve section 44, the driving robot 100 may set the suspension and the stabilizer to the shock alleviation mode.

On the other hand, based on the driving robot 100 passing a blind spot such as the narrow path 42 and the general path 43, the driving robot 100 may set the suspension and the stabilizer to the shock preparation mode to prepare for a sudden shock such as an obstacle appearing.

That is, the driving robot 100 may set the driving mode to the shock alleviation mode if the occurrence of shock is predicted or there is sufficient time until the occurrence of shock. Alternatively, the driving robot 100 may set the driving mode to the shock alleviation mode to prepare for a sudden shock which may occur in an undetected area or if there is insufficient time until the occurrence of shock. The driving robot 100 may stably transfer the load until the destination by controlling the suspension and the stabilizer in the above-described process.

Figure 11A:
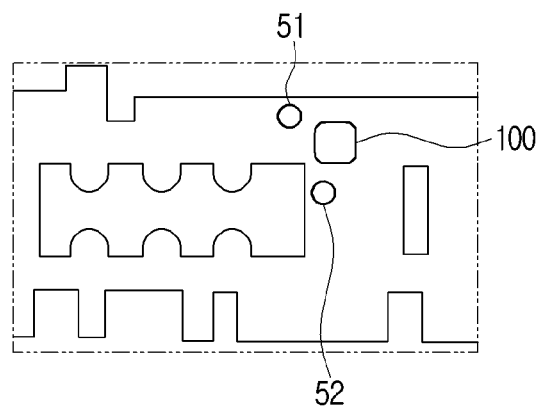
FIG. 11A and FIG. 11B are diagrams illustrating a driving mode setting according to a distance of an obstacle according to an embodiment.
Figure 11B:
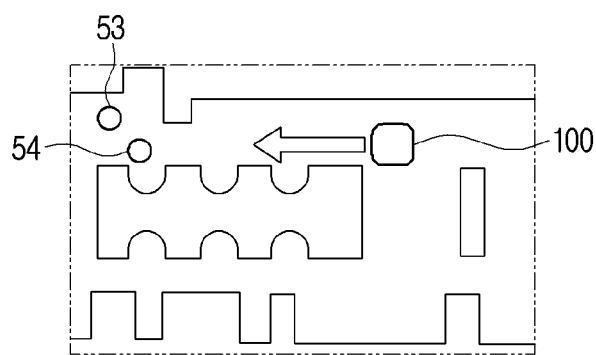

FIG. 11A and FIG. 11B are diagrams illustrating a driving mode setting according to a distance of an obstacle according to one or more embodiments. FIG. 11A and FIG. 11B will be referenced and described together.

Referring to FIG. 11A, the diagram of obstacles 51 and 52 positioned closely with the driving robot 100 is shown, and referring to FIG. 11B, a diagram of obstacles 53 and 54 positioned further away from the driving robot 100 is shown.

The driving robot 100 may identify a distance with an obstacle detected through a sensor. The driving robot 100 may set the suspension and the stabilizer to the shock alleviation mode based on the detected obstacle being positioned within a pre-set distance and set the suspension and the stabilizer to the shock preparation mode based on the detected obstacle being positioned at a distance farther than the pre-set distance. Because the shock alleviation mode and the shock preparation mode have been described in detail above, the descriptions thereof will be omitted here.

In the above, various embodiments of the driving robot for stably delivering a load has been described. A controlling method of the driving robot will be described below.

Figure 12:
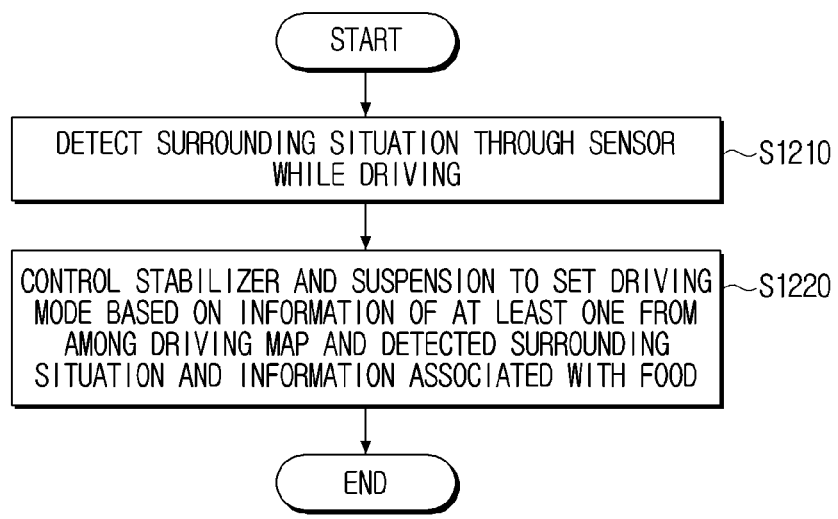
FIG. 12 is a flowchart illustrating a controlling method of a driving robot according to an embodiment.

FIG. 12 is a flowchart illustrating the controlling method of the driving robot according to one or more embodiment.

Referring to FIG. 12, the driving robot may load a load and drive to a destination. For example, the load may include food types, various products, and the like, and the food types may include a liquid type having fluidity, a non-liquid type having near no fluidity, or the like. In operation S1210, the driving robot may detect the surrounding situation while driving by using the sensor. For example, the driving robot may include an image sensor, an infrared sensor, an ultrasonic sensor, a ToF sensor, a LiDAR sensor, a laser sensor, a motion recognition sensor, and the like, and detect the surrounding situation.

Based on the load being a food type, in operation S1220, the processor of the driving robot may control the stabilizer and the suspension to set the driving mode based on information of at least one from among the driving map and the detected surrounding situation and information associated with food. The driving map may be stored in the memory of the driving robot. For example, information associated with food may include weight information of the food, information on whether it is a liquid type, and the like.

The driving mode may include the shock preparation mode and the shock alleviation mode. For example, based on the driving robot passing a blind spot, the processor of the driving robot may set the driving mode to the shock preparation mode. The processor may position the support member of the suspension in a middle area between the second end area at which the wheel is positioned and the first end area which is opposite of the area at which the wheel is positioned. The suspension may be configured to move in the horizontal direction between the end areas. Then, the processor may decrease the distance between the damping plates of the stabilizer to raise the damping. The driving robot may set the driving mode to the shock preparation mode by controlling the suspension and the stabilizer in the above-described method. Alternatively, based on the driving robot discovering, through the sensor, an obstacle or detecting the shock occurring zone such as the state of the uneven road surface, the processor of the driving robot may set the driving mode to the shock alleviation mode. The processor of the driving robot may position the support member of the suspension in the second end area at which the wheel is positioned. Then, the processor may decrease the distance between the damping plates of the stabilizer to raise the damping. The driving robot may set the driving mode to the shock alleviation mode by controlling the suspension and the stabilizer in the above-described method.

In addition, the driving robot may identify the distance with the obstacle positioned on the driving path by using the sensor. The processor may set the driving mode to the shock preparation mode based on the detected obstacle being less than a pre-set distance or a time until reaching the obstacle being less than a pre-set time. Alternatively, the processor may set the driving mode to the shock alleviation mode based on the detected obstacle being greater than or equal to the pre-set distance or the time until reaching the obstacle being greater than or equal to the pre-set time.

Alternatively, the driving robot may identify a characteristic of the load prior to transporting the load, and control the suspension or the stabilizer according to the characteristic of the identified load. For example, the driving robot may detect the weight of the load loaded on the loading member using the sensor. Then, the processor may control the distance between the damping plates included in the stabilizer to adjust the damping based on the detected weight of the load. Based on the weight of the load being greater than or equal to a pre-set weight, the processor may raise the damping by decreasing the gap of the damping plates in the stabilizer. Alternatively, based on the weight of the load being less than the pre-set weight, the processor may lower the damping by increasing the gap of the damping plates in the stabilizer.

Alternatively, the sensor may detect a frequency generated from the load loaded on the loading member. When loading the load on the loading member, the load may vibrate for a certain time due to inertia, and the like. The sensor may detect the frequency from the vibration of the load. For example, based on a frequency of a pre-set first range being detected, the processor may identify that the load is not a liquid type based on the frequency of the first range detected from the sensor. Alternatively, based on a frequency of a pre-set second range being detected, the processor may identify that the load is a liquid type based on the frequency of the second range detected from the sensor. The processor may lock the stabilizer if the load is not a liquid type, and unlock the stabilizer if the load is a liquid type.

The processor may control the suspension and the stabilizer in the above-described process, and control each configuration of the driving robot such that the driving robot is able to stably transfer the load to the destination based on the stored driving map or the detected surrounding situation.

The controlling method of the driving robot according to the various embodiments described above may be provided in a computer program product. The computer program product may include a software (S/W) program itself or a non-transitory computer readable medium stored with the S/W program.

The non-transitory computer readable medium may refer to a medium that stores data semi-permanently rather than storing data for a very short time, such as, for example, and without limitation, a register, a cache, a memory, and the like, and is readable by a device. Specifically, the various applications or programs described above may be stored and provided in the non-transitory computer readable medium such as, for example, and without limitation, a compact disc (CD), a digital versatile disc (DVD), a hard disc, a Blu-ray disc, a USB, a memory card, a ROM, and the like.

What is claimed is:

1. A driving robot comprising:
   a sensor;
   a loading member configured to load food;
   a stabilizer provided at a bottom portion of the loading member, the stabilizer comprising:
     a top plate,
     a bottom plate, and
     damping plates provided between the top plate and the bottom plate, and configured to adjust damping;
   a driving device comprising a suspension and a wheel, the suspension comprising a support member being configured to move in a horizontal direction between a second end area at which the wheel is positioned and a first end area which is in an opposite direction of an area at which the wheel is positioned; and
   a processor configured to control the stabilizer and the suspension based on at least one of information associated with the food, information obtained from a driving map or information of a surrounding situation detected by the sensor,
   wherein the processor is further configured to control the suspension by moving the support member in the horizontal direction based on a driving mode of the driving robot.

2. The driving robot of claim 1,
   wherein the processor is further configured to, in a shock preparation driving mode:
   position the support member of the suspension in a middle area between the second end area and the first end area, and
   raise the damping by decreasing a distance between the damping plates of the stabilizer, and
   wherein the processor is further configured to, in a shock alleviation driving mode:
   position the support member of the suspension in the second end area, and
   raise the damping by decreasing the distance between the damping plates of the stabilizer.

3. The driving robot of claim 2, wherein the processor is further configured to, based on a blind spot being detected while driving, set the driving mode to the shock preparation driving mode.

4. The driving robot of claim 2, wherein the processor is further configured to, based on an obstacle or a shock occurring zone being detected while driving, set the driving mode to the shock alleviation driving mode.

5. The driving robot of claim 2, wherein the processor is further configured to identify a distance to an obstacle detected through the sensor,
   based on identifying at least one of the obstacle being less than a pre-set distance or a time until reaching the obstacle being less than a pre-set time, set the driving mode to the shock preparation driving mode, and
   based on identifying at least one of the obstacle being greater than or equal to the pre-set distance or the time until reaching the obstacle being greater than or equal to the pre-set time, set the driving mode to the shock alleviation driving mode.

6. The driving robot of claim 2, wherein the suspension comprises a shock absorption member provided at a top portion of the first end area.

7. The driving robot of claim 1, wherein the stabilizer comprises an elastic friction member provided between the damping plates.

8. The driving robot of claim 1, wherein the sensor comprises a weight detection sensor provided in the loading member,
   wherein the information associated with the food comprises weight information of the food, and
   wherein the processor is further configured to control a distance between the damping plates of the stabilizer to adjust the damping based on the weight information of the food detected through the weight detection sensor.

9. The driving robot of claim 1, wherein the sensor comprises an acceleration sensor provided in the loading member,
   wherein the information associated with the food comprises information on whether the food is a liquid type, and
   wherein the processor is further configured to:
   identify, based on a frequency of a pre-set first range being detected through the acceleration sensor, that the food is not a liquid type, and
   identify, based on a frequency of a pre-set second range being detected, that the food is a liquid type.

10. The driving robot of claim 9, wherein the processor is further configured to:
    lock the stabilizer based on the food not being a liquid type, and
    unlock the stabilizer based on the food being a liquid type.

11. A controlling method of a driving robot comprising a sensor, a loading member, a stabilizer provided at a bottom portion of the loading member, and a driving device comprising a suspension and a wheel, the method comprising:
    detecting a surrounding situation through the sensor while driving; and
    controlling the stabilizer and the suspension based on at least one of information associated with food loaded on the loading member, information obtained from a driving map or information of the detected surrounding situation, wherein the suspension comprises support member being configured to move in a horizontal direction between a second end area at which the wheel is positioned and a first end area which is in an opposite direction of an area at which the wheel is positioned, and wherein controlling the suspension comprises moving the support member in the horizontal direction based on a driving mode of the driving robot.

12. The method of claim 11, wherein the controlling the stabilizer and the suspension comprises, in a shock preparation driving mode:
    positioning the support member of the suspension in a middle area between the second end area and the first end area, and
    raising damping by decreasing a distance between damping plates of the stabilizer, and wherein the controlling the stabilizer and the suspension comprises, in a shock alleviation driving mode:
    positioning the support member of the suspension in the second end area, and
    raising the damping by decreasing the distance between the damping plates of the stabilizer.

13. The method of claim 12, wherein the controlling the stabilizer and the suspension comprises, based on a blind spot being detected while driving, setting the driving mode to the shock preparation driving mode.

14. The method of claim 12, wherein the controlling the stabilizer and the suspension comprises, based on an obstacle or a shock occurring zone being detected while driving, setting the driving mode to the shock alleviation driving mode.

15. The method of claim 12, wherein the controlling the stabilizer and the suspension comprises:
    identifying a distance with an obstacle detected through the sensor,
    based on identifying at least one of the obstacle being less than a pre-set distance or a time until reaching the obstacle being less than a pre-set time, setting the driving mode to the shock preparation driving mode, and
    based on identifying at least one of the obstacle being greater than or equal to the pre-set distance or the time until reaching the obstacle being greater than or equal to the pre-set time, setting the driving mode to the shock alleviation driving mode.

16. A driving robot comprising:
    a sensor;
    a loading member configured to load food;
    a stabilizer comprising damping plates configured to adjust damping;
    a driving device comprising a suspension and a wheel, the suspension comprising a support member being configured to move in a horizontal direction between a second end area at which the wheel is positioned and a first end area which is in an opposite direction of an area at which the wheel is positioned; and
    a processor configured to control the stabilizer and the suspension based on information of a surrounding situation detected by the sensor, and information associated with the food,
    wherein the processor is further configured to control the suspension by moving the support member in the horizontal direction based on a driving mode of the driving robot.

17. The driving robot of claim 16, wherein the processor is further configured to, in a shock preparation driving mode:
    position the support member of the suspension in a middle area between the second end area and the first end area-which is opposite of an area at which the wheel is positioned, the support member configured to move in a horizontal direction between the second end area and the first end area, and
    raise the damping by decreasing a distance between the damping plates of the stabilizer.

18. The driving robot of claim 17, wherein the processor is further configured to, based on a blind spot being detected while driving, set the driving mode to the shock preparation driving mode.

19. The driving robot of claim 16, wherein the processor is further configured to, in a shock alleviation driving mode:
    position the support member of the suspension in the second end area at, and
    raise the damping by decreasing the distance between the damping plates of the stabilizer.

20. The driving robot of claim 19, wherein the processor is further configured to, based on an obstacle or a shock occurring zone being detected while driving, set the driving mode to the shock alleviation driving mode.

* * * * *